Patented July 17, 1951

2,561,254

UNITED STATES PATENT OFFICE 2,561,254

UNSATURATED ETHER-ALDEHYDES AND ACETALS THEREOF

Richard R. Whetstone, Curtis W. Smith, and Douglas G. Norton, Berkeley, Calif., assignors to Shell Development Company, San Francisco, Calif., a corporation of Delaware No Drawing. Application March 23, 1948, Serial No. 16,616

16 Claims. (Cl. 260—602)

This invention relates to new and valuable unsaturated organic compounds and to a method for their preparation. More particularly, the present invention relates to new and valuable unsaturated organic compounds that may be prepared by reacting under controlled conditions allylic alcohols with alpha-methylene aliphatic aldehydes, and also to polymers and copolymers of the new compounds. In a more specific embodiment the invention relates to novel ether-aldehydes wherein an allyl-type aliphatic hydrocarbon group is attached to the ethereal oxygen atom, and to a method for their preparation which comprises reacting an allyl-type alcohol with a suitable aliphatic alpha-methylene aldehyde.

An object of the present invention is new and useful unsaturated ethers of lower beta-oxy aliphatic aldehydes and acetals of the new unsaturated ether-aldehydes. Another object of the invention is new and useful unsaturated organic compounds that may be prepared by reacting allylic alcohols with alpha-methylene lower aliphatic aldehydes. A further object is ether-aldehydes according to the foregoing wherein the ethereal oxygen atom is bonded to an allyl-type hydrocarbon group that contains a vinyl olefinic bond

in the beta,gamma position with respect to the alpha carbon atom of the hydrocarbon group. A still further object of the invention is ether-aldehydes according to the foregoing in which the carbon atom adjacent to the carbon atom of the formyl group is a tertiary carbon atom, and a process for the preparation of the same. Acetals of the novel ether-aldehydes and polymers and co-polymers of the novel compounds of the invention constitute further important objects of the invention. Other objects of the invention will become apparent hereinafter.

The objects of the invention have been accomplished in accordance with the invention by the hereinafter described novel allylic ethers of beta-oxy lower aliphatic aldehydes and acetals thereof, and by polymers of the novel compounds and copolymers of the novel compounds with polymerizable vinyl compounds. The new ether aldehyde to which the invention relates are unsaturated ethers which result from replacement of the hydrogen atom of the hydroxyl group of a beta-oxy (i. e., beta-hydroxy) lower saturated aliphatic aldehyde, preferably one containing from three to eight carbon atoms, by an allyl-type hydrocarbon group. The novel acetals to which the invention relates may be corresponding allylic acetals of the unsaturated ether-aldehyde, or the geminate ether groups (acetal ether groups) may contain hydrocarbon groups that differ from the allyl-type hydrocarbon group that has replaced the hydrogen atom of said hydroxyl group.

Compounds of the type wherein a saturated hydrocarbon group, e. g., a lower alkyl group, has replaced the hydrogen atom of the hydroxyl group of a lower aliphatic beta-oxy aldehyde are known. The compounds of the present invention are distinguishable from the compounds of this known type, however, because in the present compounds an unsaturated hydrocarbon group of the allyl-type is directly attached to the ethereal oxygen atom. The novel unsaturated ether-aldehydes have been found to possess inherent properties which are markedly superior to the properties of the known compounds. The superior characteristics of the present novel compounds could not have been foreseen, and they are of such a nature that they render the compounds of the invention especially valuable in various applications.

An important group of compounds that has been provided by the present invention comprises the unsaturated ether-aldehydes that may be represented by the formula.

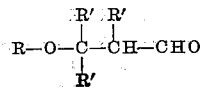

in which R represents an allyl-type hydrocarbon group, and R' represents a hydrogen atom or a lower alkyl group, preferably a methyl, ethyl, propyl, isopropyl, a butyl or a pentyl group.

A further important group of compounds that has been provided by the invention is embodied in the allyl-type acetals of the foregoing unsaturated ether-aldehydes. These valuable acetals may be represented by the formula

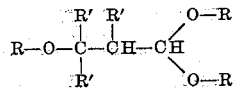

in which R and R' have their above significance.

In the generic concepts of the invention, the unsaturated hydrocarbon groups that may be represented by R in the foregoing formulas may be any allyl-type hydrocarbon group. It may therefore be any group which contains an arrangement of atoms such that the carbon atom which is attached to the ethereal oxygen atom is saturated and is directly attached by a univalent bond to a second carbon atom which, in turn, is directly attached by a double bond to a third carbon atom. The other valencies of these carbon atoms may be satisfied by union with hydrogen atoms or with other suitable atoms of groupings of atoms. They may be attached, for example, to alkyl groups such as the methyl, ethyl, propyl, butyl, and high butyl groups including nonyl, decyl, and their homologs, cyclohexyl, phenyl, etc., groups, or to an alkoxy group, e. g., a methoxy or ethoxy group. The allyl-type hydrocarbon groups may be represented generically by the formula

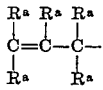

in which $R^a$ represents a hydrogen atom, a hydrocarbon group, or other suitable substituent. The olefinic bond in the allyl-type hydrocarbon groups may be referred to as occupying the beta,gamma position in the group relative to the carbon atom which is attached by the unsatisfied valency in the above formula to the ethereal oxygen atom in the ether-aldehydes of the present invention.

A valuable group of the compounds according to the invention comprises the allylic ethers of beta-oxy lower saturated aliphatic aldehydes in which the allyl-type hydrocarbon group contains a vinyl bond in the beta,gamma position with respect to the carbon atom which is attached to the ether oxygen atom.

In the ether-aldehydes of this group, the unsaturated hydrocarbon group that has replaced the hydrogen atom of the oxy group of the beta-oxy aldehyde may be represented by the formula

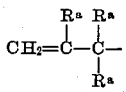

in which $R^a$ may have the significance explained above. A preferred group of the unsaturated ether-aldehydes provided by the invention is limited to those compounds of the invention in which the allyl-type hydrocarbon group is attached to the ethereal oxygen atom at a primary carbon atom, that is, at a carbon atom that is directly linked to only one carbon atom, and in which the remaining two valencies of this primary carbon atom are satisfied by union with hydrogen atoms. In these preferred compounds, the unsaturated hydrocarbon group that is linked to the ethereal oxygen atom may be represented by the formula

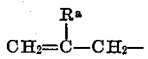

in which $R^a$ has its hereinbefore explained significance.

Representative allyl-type hydrocarbon groups may be illustrated by the following: allyl (2-propenyl), methallyl (2-isobutenyl), ethallyl (2-ethyl-2-propenyl), crotyl (2-butenyl), 2-isopropyl-2-propenyl, 2-propyl-2-butenyl, 2-pentenyl, 2-isobutyl-2-propenyl, 2,5-hexandienyl, 5-hexyn-2-enyl, 2-cyclopentyl-2-butenyl, cinnamyl (3-phenyl-2-propenyl), 2-chloro-2-propenyl, 2-cyclohexenyl, 2-bromo-2-butenyl, 2,3-dimethyl-2-butenyl, 2-ethyl-3-isopropyl-2-pentenyl, 2-phenyl-2-propenyl, and 2-tolyl-2-butenyl. Other allyl-type hydrocarbon groups are 4-methyl-2-pentenyl, 2-methylene-4-pentenyl, 2-naphthyl-2-butenyl, 2-methyl-3-ethyl-2-heptenyl, 2-methyl-3-phenyl-2-propenyl, 2-chloro-3-phenyl-2-propenyl, 2-cyclohexenyl, 2-cyclopentenyl, 3-methyl-2-cyclohexenyl, 4-ethyl-2-cyclohexenyl, etc.

Representative unsaturated ether-aldehydes of the invention having structures represented by the hereinbefore designated generic formula include, among others, the following:

Beta-allyloxypropionaldehyde
Beta-allyloxyisobutyraldehyde
Beta-allyloxy-alpha-ethylpropionaldehyde
Beta-allyloxy-alpha-propylpropionaldehyde
Beta-allyloxy-alpha-methylbutyraldehyde
Beta-allyloxy-alpha-methylvaleraldehyde
Beta-allyloxy-alpha-propylbutyraldehyde
Beta-allyloxy-alpha-ethylvaleraldehyde
Beta-(2-butenyloxy)propionaldehyde
Beta-(2-pentenyloxy)propionaldehyde
Beta-(2-hexenyloxy)propionaldehyde
Beta-cinnamyloxypropionaldehyde
Beta-(2-chloro-2-propenyloxy)propionaldehyde
Beta-(2-bromo-2-butenyloxy)propionaldehyde
Beta-(2-iodo-2-propenyloxy)isobutyraldehyde
Beta-methallyloxybutyraldehyde
Beta-ethallyloxyvaleraldehyde
Beta-(2-phenyl-2-butenyloxy)propionaldehyde
Beta-(2-fluoro-2-butenyloxy)isobutyraldehyde
Beta-(2-butenyloxy)butyraldehyde
Beta - (2 - chloro-3-phenyl-2-propenyloxy)propionaldehyde An especially desirable group of ether-aldehydes of the present invention is provided by those members of the more generic class which contain a methylene group ($CH_2=$) bonded to the beta carbon atom of the allylic hydrocarbon group and in which the ether oxygen atom interconnects two primary carbon atoms, that is, two carbon atoms each of which is bonded to only one carbon atom. These preferred compounds may be regarded as formed by replacement of the hydrogen atom of the hydroxy group of a beta-hydroxy lower saturated aliphatic aldehyde in which the hydroxyl group is a primary alcoholic hydroxyl group by the allyl-type hydrocarbon radical of a primary allylic alcohol wherein there is a methylene group attached to the beta carbon atom. The compounds of this preferred group desirably are completely aliphatic, i. e. they desirably contain only aliphatic carbon-to-carbon bonds. They desirably contain from six to eighteen carbon atoms. Ether-aldehydes within this preferred group may be conveniently represented by the formula

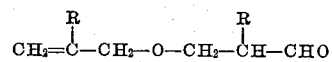

in which R represents a hydrogen atom or an alkyl group, preferably an alkyl group containing from one to six carbon atoms.

A valuable group of ether-aldehydes included in the group represented by the preceding formula is composed of the allyl ethers corresponding to the formula, that is, the ether-aldehydes that are obtained when the R attached to the beta carbon atom of the unsaturated hydrocarbon group represents the hydrogen atom. These allyl ethers have desirable and unexpected characteristics which render them of particular value in certain special applications. For example, they may be employed for the preparation of biologically active compounds, e. g., improved chemotherapeutic agents. The presence of a tertiary carbon atom in the beta position of the unsaturated hydrocarbon group may desirably modify the characteristics of the ether-aldehydes. For example, the ether-aldehydes corresponding to the last-given formula when the carbon atom in the beta position of the unsaturated hydrocarbon group is a tertiary carbon atom as when the R attached to said carbon atom represents an alkyl group, preferably one containing from 1 to 6 carbon atoms, may be employed in the production of resins, e. g., of the phenol-aldehyde or urea-aldehyde type.

A valuable sub-group within this preferred group comprises the ether-aldehydes, as described, in which the beta carbon atom of the allylic hydrocarbon group is a tertiary carbon atom. This valuable sub-group may be referred to by the formula $$CH_2=\underset{R}{C}-CH_2-O-CH_2-\underset{R'}{CH}-CHO$$

in which R represents a lower alkyl group and R' represents a hydrogen atom or a lower alkyl group.

One convenient method of preparing the novel ether aldehydes to which the invention relates comprises reacting a lower alpha,beta-olefinic aliphatic aldehyde with an allyl-type alcohol in the presence of a condensation catalyst. The reaction which occurs may be illustrated by the equation in which primary allyl-type alcohols are reacted with alpha-methylene lower alphatic aldehydes to form certain of the preferred compounds of the invention. The equation is as follows:

$$CH_2=\underset{R}{C}-CH_2OH + CH_2=\underset{R}{C}-CHO \longrightarrow$$
$$CH_2=\underset{R}{C}-CH_2-O-CH_2-\underset{R}{CH}-CHO$$

Representative compounds which may be thus prepared according to the invention include, among others, the following:

Beta-allyloxypropionaldehyde, $$CH_2=CH-CH_2-O-CH_2-CH_2-CHO$$

which may be prepared by reacting allyl alcohol and acrolein.

Beta - allyloxy - alpha - methylpropionaldehyde (beta-allyloxyisobutyraldehyde), $$CH_2=CH-CH_2-O-CH_2-\underset{CH_3}{CH}-CHO$$

which may be prepared by reacting allyl alcohol and methacrolein (alpha-methylacrolein).

Beta-methallyloxypropionaldehyde, $$CH_2=\underset{CH_3}{C}-CH_2-O-CH_2-CH_2-CHO$$

which may be prepared by reacting methallyl alcohol (2-methyl-propenol) and acrolein.

Beta - methallyloxy - alpha - methylpropionaldehyde, $$CH_2=\underset{CH_3}{C}-CH_2-O-CH_2-\underset{CH_3}{CH}-CHO$$

which may be prepared by reacting methallyl alcohol and methacrolein.

Beta - allyloxy - alpha - ethylpropionaldehyde, $$CH_2=CH-CH_2-O-CH_2-\underset{C_2H_5}{CH}-CHO$$

which may be prepared by reacting allyl alcohol and alpha-ethylacrolein.

Beta- methallyloxy - alpha - ethylpropionaldehyde, $$CH_2=\underset{CH_3}{C}-CH_2-O-CH_2-\underset{C_2H_5}{CH}-CHO$$

which may be prepared by reacting methallyl alcohol and alpha-ethylacrolein.

Beta-allyloxy-alpha-propylacrolein, $$CH_2=CH-CH_2-O-CH_2-\underset{\underset{CH_2}{\overset{CH_2}{|}}}{\overset{CH_2}{|}}CH-CHO$$

which may be prepared by reacting allyl alcohol and alpha-propyl acrolein.

Beta - allyloxy - alpha - isopropylpropionaldehyde, $$CH_2=CH-CH_2-O-CH_2-\underset{\underset{CH_3}{CH}\diagdown CH_3}{CH}-CHO$$

which may be prepared by reacting allyl alcohol and alpha-isopropyl acrolein.

Beta - methallyloxy - alpha - isopropylpropionaldehyde, $$CH_2=\underset{CH_3}{C}-CH_2-O-CH_2-\underset{\underset{CH_3}{CH}\diagdown CH_3}{CH}-CHO$$

which may be prepared by reacting methallyl alcohol with alpha-isopropylacrolein.

Beta - (2 - ethyl - 2 - propenyloxy)propionaldehyde, $$CH_2=\underset{\underset{CH_3}{CH_2}}{C}-CH_2-O-CH_2-CH_2-CHO$$

which may be prepared by reacting 2-ethyl-2-propenol and acrolein.

Beta - (2 - propyl - 2 - propenyloxy) - alpha-methylpropionaldehyde, $$CH_2=\underset{\underset{\underset{CH_3}{CH_2}}{CH_2}}{C}-CH_2-O-CH_2-\underset{CH_3}{CH}-CHO$$

which may be prepared by reacting 2-propyl-2-propenol with methacrolein.

Beta-allyloxy-alpha-butylpropionaldehyde, $$CH_2=CH-CH_2-O-CH_2-\underset{(CH_2)_3}{\underset{|}{\overset{CH_3}{|}}}CH-CHO$$

which may be prepared by reacting allyl alcohol and alpha-butylacrolein.

Beta - (2 - butyl - 2 - propenyloxy) -alpha-methylpropionaldehyde, $$CH_2=\underset{\underset{\underset{CH_3}{(CH_2)_3}}{|}}{C}-CH_2-O-CH_2-\underset{CH_3}{CH}-CHO$$

which may be prepared by reacting 2-butyl-2-propenol and methacrolein.

Beta - methallyloxy - alpha-butylpropionaldehyde, $$CH_2=\underset{CH_3}{C}-CH_2-O-CH_2-\underset{(CH_2)_3}{\underset{|}{\overset{CH_3}{|}}}CH-CHO$$

which may be prepared by reacting methallyl alcohol and alpha-butylacrolein.

Beta - allyloxy-alpha-isobutylpropionaldehyde, $$CH_2=CH-CH_2-O-CH_2-\underset{\underset{\underset{CH}{CH_2}}{|}}{CH}\diagdown CH_3-CHO$$

which may be prepared by reacting allyl alcohol and alpha-isobutylacrolein.

Beta-allyloxy-alpha-hexylpropionaldehyde,

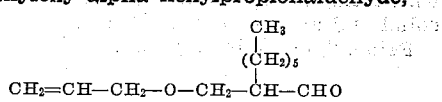

which may be prepared by reacting allyl alcohol and alpha-hexylacrolein.

Beta - methallyl-alpha-pentylpropionaldehyde,

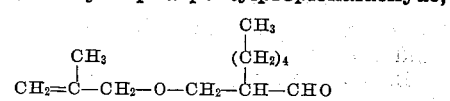

which may be prepared by reacting methallyl alcohol and alpha-pentylacrolein.

Beta - (2-pentyl-2-pentenyloxy) -alpha-butyl-propionaldehyde,

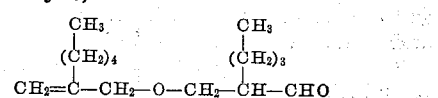

which may be prepared by reacting 2-pentyl-2-propenol and alpha-butylacrolein.

In certain cases, it is desirable that the carbon atom to which the formyl group is bonded shall be a secondary carbon atom, as in the allyl-type ethers of beta-oxy propionaldehyde. Another valuable group of allylic ether-aldehydes comprises those members of the more generic class in which the carbon atom immediately adjacent to the formyl group is a tertiary carbon atom.

Acetals of the allylic ether-aldehydes of the invention may be prepared by reacting the ether-aldehydes with allylic or other alcohols according to methods known for the preparation of acetals of aldehydes, or they may be prepared by reacting alpha,beta-olefinic lower aliphatic aldehydes with alcohols according to the illustrative equation

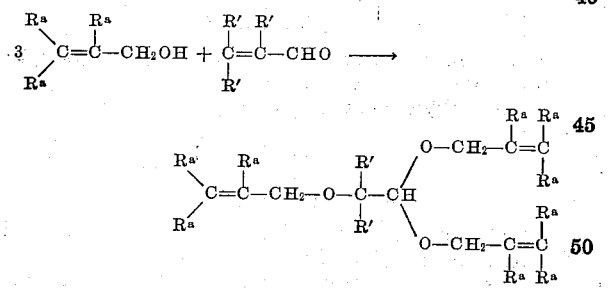

in which $R^a$ and $R'$ may have their hereinbefore defined significance. Representative acetals of the allylic ethers of beta-oxy aldehydes are the diallyl acetals, the dimethallyl acetals, the bis(2-ethyl-2-propenyl) acetals, the bis(2-propyl-2-propenyl) acetals, the bis(2-isopropyl-2-propenyl) acetals, the bis(2-butyl-2-propenyl) acetals, the bis(2-isobutyl-2-propenyl) acetals, the bis(2-pentyl - 2 - propenyl) acetals, the bis(2-hexyl-2-propenyl) acetals, the bis(2-heptyl-2-propenyl) acetals, the bis(2-octyl-2-propenyl) acetals, the dicrotyl acetals, etc.

Instead of the allylic acetals, there may be prepared acetals of the novel ether-aldehydes with other alcohols, such as the dialkyl acetals, diaryl acetals, dialkaryl acetals, dicycloalkyl acetals, and mixed acetals. A particularly preferred group of acetals comprises the allylic acetals represented by the structural formula

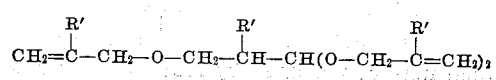

in which each $R'$ represents a hydrogen atom or an alkyl group. Especially valuable acetals are obtained when $R'$ represents an alkyl group containing from one to six carbon atoms. The allylic acetals of the hereindescribed allyl ethers of beta-oxy aldehydes are of especial value because they constitute useful raw materials for the production of polymers which, by partial hydrolysis and mild reduction, e. g. hydrogenation, may be converted to industrially useful and desirable products.

The novel ether-aldehydes of the invention may be prepared conveniently by reacting in the liquid state an allylic alcohol with a suitable alpha,beta-olefinic aldehyde in the presence of a condensation catalyst. The selection of the condensation catalyst that will be employed is determined in part by the reactants that are employed, and in part by the products that it is desired to prepare. Generally speaking, the use of acidic condensation catalysts has been found to favor the formation of the allylic acetals of the allylic ether-aldehydes, in some cases to the substantial exclusion of the ether-aldehyde. On the other hand, the use of alkaline condensation catalysts generally favors the formation of the desired ether-aldehyde to the substantial exclusion of its acetal. If desired, the acetal formed in the presence of acidic condensation catalysts may be hydrolyzed by treatment with dilute aqueous acid and thereby converted to the corresponding allylic ether-aldehyde.

Acidic condensation catalysts which may be employed to catalyze the reaction between the allylic alcohols and the alpha,beta-olefinic aldehydes include the strong mineral acids, such as sulfuric acid, hydrochloric acid, phosphoric acid, selenic acid, etc., acidic salts, such as zinc chloride, aluminium sulfate, stannous chloride, sodium acid sulfate, sodium dihydrogen phosphate, etc., and organic acids, such as the lower aliphatic monocarboxylic acids, dicarboxylic acids, halogen-substituted lower fatty acids, aryl sulfonic acids, etc. The strong mineral acids are preferred. Amounts of the acidic condensation catalyst from the merest trace to 5 per cent or more of the combined weight of the reactants may be employed, a generally preferable range being from about 0.05 to about 3 per cent by weight of the reactants. However, when the allylic alcohol is one in which the carbon atom adjacent to the carbinol group is a tertiary carbon atom, e. g., methallyl alcohol, minimal amounts of acidic condensation catalysts are employed to minimize possible conversion of the alcohol to the isomeric isoalkanal.

Alkaline condensation catalysts which may be employed include the alkali metal hydroxides, such as sodium hydroxide, potassium hydroxide, lithium hydroxide and even rubidium and caesium hydroxides, the alkaline earth metal hydroxides, including calcium, strontium, and barium hydroxides, the alkali metal carbonates and the alkaline earth metal carbonates, ammonia, and organic amines. Preferred alkaline condensation catalysts comprise the caustic metal alkalies, sodium hydroxide being especially desirable. Carefully regulated small amounts of the alkaline condensation catalysts are employed, since excessive amounts tend to cause undesired polymerization of the alpha,beta-olefinic aldehyde. Amounts providing concentrations in the reaction mixture up to about 0.02 mole of the alkali per liter of the mixture are generally suitable, a preferred maximum being about 0.01 mole per liter.

Molar ratios of alcohol:aldehyde from about 1:1 to about 10:1 may be employed, a preferred range from about 2:1 to about 7:1. When acidic catalysts are employed temperatures of from about 0° C. to about 100° C. are suitable, a preferred range being from about 5° C. to about 40° C. When alkaline catalysts are used, temperatures not in excess of 40° C. desirably are employed because of excessive formation of polymers that occurs at substantially higher temperatures.

Instead of the aforementioned acid condensation catalysts there may be employed as the catalyst in accordance with a preferred embodiment of the invention a solid, insoluble cation-exchange resin capable of existing in a hydrogen form, substantially in its hydrogen form. Suitable cation-exchange materials include sulfonated organic solids, such as sulfonated coal, lignin, charcoal, cellulose or the like, and the cation-exchange resins, such as sulfonated phenol-aldehyde condensate, sulfonated hydrocarbon polymers of the polystyrene type resins of the formaldehyde-tannin type, sulfited quebracho-formaldehyde condensate, or like material. See for example, United States Patents No. 2,191,853; 2,104,501; and also United States Patents No. 2,198,381; 2,340,110; 2,340,111; 2,366,007; and 2,372,233. Preferred cation-exchange materials are those which contain in their hydrogen form nuclear sulfonic acid groups and/or methylene sulfonic acid groups. When such a cation-exchange material is used as the catalyst, it may be contacted at the reaction temperature with a mixture of the allylic alcohol and the alpha,beta-olefinic aldehyde to effect the desired reaction. After the reaction has proceeded, the mixture may be separated from the cation-exchange material and directly treated to recover the desired reaction product. In the preferred practice, a stationary porous bed of the cation exchange material, preferably in granular or finely divided form, is positioned in a suitable vessel, and a stream of the mixture of alcohol and aldehyde is passed into contact therewith, as by slowly passing the mixture either upwardly or downwardly through the bed, while maintaining the temperature within a suitable range by means of suitable heating and/or cooling means. The use of a cation-exchange material as the condensation catalyst enables the execution of the process without the necessity for neutralizing the reaction mixture prior to the recovery of the desired product. It has the further advantage of being particularly adapted to continuous operations, as over long periods of time, since the necessity for replacement, or regeneration, or replenishment of the catalyst is substantially avoided. The occurrence of side reactions is desirably minimized; for example, methallyl alcohol and the related allylic alcohols wherein the olefinic carbon atom adjacent to the carbinol group is tertiary, may be employed with substantially no conversion of the alcohol to the isomeric saturated aldehyde. In all cases, the presence of a large excess of the cation exchange material ordinarily is harmless; as a result, the necessity for careful control of the catalyst concentration is avoided, with consequent ease of operation on either a small or large scale.

After the desired reaction has proceeded, the reaction product may be recovered from the reaction mixture in any suitable manner. The catalyst, if soluble, may be neutralized and the desired product separated from the mixture, for example, by fractional distillation, by azeotropic distillation, by extraction with selective solvents, by extractive distillation, etc. When a solid cation-exchange material is employed as the catalyst, as described above, the neutralization of the catalyst is not necessary. The liquid reaction mixture after separation from the solid cation-exchange material may be treated directly to recover the desired products.

The monomeric ether-aldehydes of the invention range from low-viscosity liquids to viscous liquids to solids. The lower members of the series are when fresly prepared water-white clear liquids. Because of their reactive character, upon standing, especially in the light or in contact with the atmosphere, they may over long periods of time darken somewhat. Such darkening, if undesirable, may be prevented or reduced by addition of an antioxidant, such as hydroquinone, resorcinol or other phenolic compound, in small amounts. The novel allylic ether-aldehydes of the present invention are of value as chemical intermediates that may be employed for the production of valuable derived organic chemicals. Because of their inherent characteristics they are of value for the preparation of improved plasticizers and special solvents. They also have been found to have characteristics which render them of improved value for the synthesis of biologically active compounds.

One of the potential uses of the ether aldehydes of the invention, is in the production of polymers obtained via polymerization primarily through the medium of one or more active olefinic bonds. The monomeric compounds may be polymerized singly or in admixture one with another or with other polymerizable compounds, particularly polymerizable compounds containing one or more unsaturated carbon-to-carbon linkages, e. g., vinyl groups.

Among the polymerizable compounds which may be copolymerized with the unsaturated ether-aldehydes are vinylidene halides, vinyl halides, vinyl esters of saturated monocarboxylic acids, mixed vinylic-allylic esters of dicarboxylic acids, vinyl ethers, vinyl acetals, polymerizable hydrocarbons containing one or more vinyl groups, acrylic and the substituted acrylic acids, and esters thereof, acrylonitriles, amides, etc. An important group of polymerizable olefinic compounds which may be copolymerized with the compounds of the invention to provide valuable copolymers contains in the molecule one or more atoms of inorganic elements, as exemplified by the vinyl, allyl, and methallyl esters of phosphoric acid, of silicon acids, especially ortho acids of silicon, boric acid, etc. Diallylic esters of dicarboxylic acids, e. g., diallyl phthallate, dimethyallyl adipate, diallyl glutarate, diallyl oxalate, etc., constitute another group of compounds with which the compounds of the invention advantageously may be copolymerized. Allylic ethers and allylic ether-esters of hydroxycarboxylic acids, e. g., allyl allyloxyacetate, methallyl allyloxypropionate, allyl p-allyloxybenzoate, etc. also may be polymerized with the compounds of the invention. Amounts of the unsaturated ether-aldehydes from as little as 5% to as much as 95% by weight of the total polymerizable materials may be employed for the preparation of useful copolymers.

The unsaturated ether-aldehydes which contain at least one methylene group in their structure are particularly desirable for the preparation of polymers and copolymers. The allylic group that is attached to the ethereal oxygen atom preferably contains a methylene group at the beta carbon atom thereof; in other words, the allylic group preferably is unsubstituted at its gamma carbon atom.

The compounds to which the invention pertains may be polymerized, and copolymerized with polymerizable unsaturated compounds as above described, by subjecting them alone or in admixture with such polymerizable compounds to the action of agents effective in causing polymerization through carbon-to-carbon unsaturated bonds. Generally speaking, such agents which may be employed are heat, light, especially the ultra-violet, oxygen, peroxides or other oxygen-containing catalysts, and combinations of such agents. Organic peroxides may be employed as the polymerization catalyst. These include, among others, benzoyl peroxide, dibutyryl peroxide, acetal peroxides, stearyl peroxide, propionyl peroxide, diamyl peroxide, benzoyl propionyl peroxide, benzoyl acetyl peroxide, diethyl peroxide, tertiary alkyl hydroperoxide, succinyl peroxide, etc. Inorganic per compounds, such as hydrogen peroxide, ozone, sodium peroxide, persulfates, perborates, etc., also may be employed as the polymerization catalyst. A further valuable group of polymerization catalysts comprises the di(tertiary alkyl) peroxides, notably di(tertiary butyl) peroxide. See United States Patent 2,426,476, to Vaughan and Rust. If desired, mixtures of polymerization catalysts may be employed, for example, a mixture of hydrogen peroxide and succinyl peroxide. The amount of the peroxide polymerization catalyst conveniently may be from about 0.001% to about 5% by weight of the monomer, although larger or smaller amounts may be employed if desirable.

The polymerization may be activated, or energized, or accelerated by the application of heat, or light, or both. Temperatures of from about 50° C. to about 150° C. are preferred, especially when the polymerization is effected with the aid of a peroxide catalyst. The monomeric compounds may be polymerized in the massive state, in solution, in a solvent, or in dispersed form in a non-solvent for the monomers. When the polymerization is effected with the monomers dispersed in a non-solvent, the liquid dispersing medium may be one in which the polymerization catalyst is soluble, or it may be one in which the catalyst is insoluble. Continuous or discontinuous processes may be used. Atmospheric, superatmospheric, or sub-atmospheric pressures may be employed in the polymerization of the monomers.

The homopolymers of the invention may range from viscous liquids to soft sub-resinous masses to hard brittle resins. The polymerization may be interrupted at any point at which the polymers have a desired consistency. When the fully-polymerized product is resinous and hard, the polymerization may be interrupted at an intermediate stage at which the polymers are still liquid, pliable, or plastic. The intermediate polymers may be incorporated with other materials into compositions intended for particular uses. Any unreacted monomer may be separated from the intermediate polymers by distillation, solvent extraction, etc. By controlling the extent of the polymerization, valuable modification in the characteristics of the polymers may be obtained.

Homopolymers of the allylic ether-aldehydes of the invention prepared from the monomers which contain a terminal methylene group attached to the beta carbon atom of the allylic group may be oxidized to obtain novel and useful polycarboxylic acids of high molecular weight. The complex polycarboxylic acids may be used, in the form of their salts, e. g., their alkali metal salts, their salts with ammonia, primary or secondary amines, etc., as surface active agents or protective colloids for use in dispersions, emulsions suspensions, and like mixtures of mutually immiscible substances. Compositions in which such salts may be employed advantageously as emulsifying agents or protective colloids include, for example, printing inks which comprise an emulsion or dispersion of film-forming materials and/or pigment in a dispersing medium, textile printing emulsions or dispersions, insecticidal and fungicidal spray emulsions or dispersions, pigmented water-dispersed paints and lacquers, clay suspensions, e. g., paper coating compositions comprising a clay with or without additional materials such as pigments, etc., bituminous emulsions, cutting oil emulsions, and the like. The free complex polycarboxylic acids may be reacted with polyhydric alcohols, such as glycols, glycerol, pentaerythritol, sugars, etc., to form improved resins of the alkyd, or polycarboxylic acid-polyhydric alcohol ester type.

Certain of the specific embodiments of the described and claimed invention are illustrated in the following examples. In the examples, the parts are by weight.

EXAMPLE I

*Beta-allyloxypropionaldehyde*

In this experiment, beta-allyloxypropionaldehyde was prepared by reaction of allyl alcohol with acrolein at the boiling point of the mixture, in the presence of acid. Two grams of paratoluene sulfonic acid were dissolved in 348 grams of allyl alcohol, and the solution was mixed with 224 grams of acrolein. The mixture was heated to the boiling point in a reaction vessel equipped with a reflux condenser open to the atmosphere, and refluxed for 95 minutes. The mixture then was cooled, neutralized by addition of an excess of solid calcium carbonate, filtered, and the filtrate was distilled under reduced pressure. Beta-allyloxypropionaldehyde was recovered in a conversion of 34% based upon the amount of acrolein applied as the fraction distilling between 71° and 73° C. under 30 millimeters' mercury pressure and having a refractive index ($n_D^{20}$) of 1.4362.

EXAMPLE II

*Beta-allyloxypropionaldehyde*

In a further embodiment of the invention, a cyclic process of operation was employed, utilizing in the reaction by-products of a preceding experiment. The experiment was started by dissolving 2.5 grams of para-toluene sulfonic acid in 580 grams of allyl alcohol, and rapidly adding 234 grams of acrolein to the solution. The mixture was heated under reflux for 80 minutes, during which time the temperature increased from 76 to 92.5° C. The acid was neutralized by addition of 5 grams of solid calcium carbonate to the cooled mixture, and the neutralized mixture was filtered. The filtrate was subjected to fractional distillation under reduced pressure and the fraction distilling between 60° C. under 20 millimeters' mercury pressure and 53° C. under 10 millimeters' mercury pressure was separated as beta-allyloxypropionaldehyde.

The materials distilling before the beta-allyloxypropionaldehyde (mostly allyl alcohol and acrolein) were combined with the products boiling above the product. To the mixture there were added 2.5 grams of para-toluene sulfonic acid, 111 grams of allyl alcohol, and 113 grams of acrolein. The resultant mixture was heated under reflux for 80 minutes (maximum temperature, 91° C.). The mixture then was neutralized by addition of solid calcium carbonate, filtered, and the filtrate was distilled. Beta-allyloxypropionaldehyde was recovered in a conversion of 76% based upon the amount of allyl alcohol and acrolein added to the combined products from the first distillation.

EXAMPLE III

*Beta-allyloxypropionaldehyde and its diallyl acetal*

A solution prepared by dissolving 24.4 grams of concentrated (98%) sulfuric acid in 1137 grams of allyl alcohol was added at room temperature to 221 grams of acrolein. The mixture spontaneously warmed to 42° C. in 15 minutes. The mixture was kept at this temperature by cooling as required until the temperature of the mixture no longer rose spontaneously. The mixture then was allowed to stand 4 days at room temperature. The sulfuric acid was largely neutralized by addition of 40 grams of sodium bicarbonate, and filtered. Residual amounts of acid were removed by treatment of the filtrate with an acid-adsorbing (anion-exchange) resin, and the neutralized mixture was distilled. A fraction amounting to 92 grams of beta-allyloxypropionaldehyde was separated between 62° and 78° C. under 20 millimeters' mercury pressure. The diallyl acetal of the beta-allyloxypropionaldehyde was separated as a fraction amounting to 214 grams distilling between 102° and 113° C. under 10 millimeters' mercury pressure. The diallyl acetal, after redistillation, was found to have a boiling point of 106° C. under 10 millimeters' mercury pressure and a refractive index $(n_D^{20})$ of 1.4513. The 2,4-dinitrophenyl hydrazone of beta-allyloxypropionaldehyde was prepared and after recrystallization from ethanol was found to melt at 73° to 73.5° C. The redistilled diallyl acetal of beta-allyloxypropionaldehyde was analyzed for carbon and hydrogen, with the following results:

Found: 67.7% C, 9.48% H; calculated for $C_{12}H_{20}O_3$: 67.9% C, 9.49% H.

EXAMPLE IV

*Beta-methallyloxyisobutyraldehyde*

Methacrolein, 140 grams, was added dropwise with stirring to 720 grams of methallyl alcohol containing 0.007 mole of NaOH per liter. The addition was carried out at 20° C. over a period of one hour. After the addition of the methacrolein was completed, the mixture was allowed to stand for three hours, then neutralized with formic acid, and fractionally distilled. Beta-methallyloxyisobutyraldehyde was recovered as a fraction distilling at 58° to 59° C. under 10 millimeters of mercury pressure and having a refractive index $(n_D^{20})$ of 1.4420. Its 2,4-dinitrophenylhydrazone was prepared and found to melt, after recrystallization from ethanol, at 57.0° to 57.5° C.

EXAMPLE V

*Beta-allyloxyisobutyraldehyde*

One hundred forty grams of methacrolein was added dropwise with stirring to 580 grams of allyl alcohol containing 0.007 mole of NaOH per liter, and the mixture was treated and worked up as in Example IV. The beta-allyloxyisobutyraldhyde was recovered in a 9% conversion based upon the methacrolein applied, as the fraction distilling between 52° and 53° C. under 10 millimeters' mercury pressure and having a refractive index $(n_D^{20})$ of 1.4320. Analyses were as follows: 65.3% C and 9.4% H (calculated for $C_7H_{12}O_2$, 65.6% C and 9.4% H). Its 2,4-dinitrophenylhydrazone was prepared and found to melt after recrystallization from ethanol at 71.8° to 72.3° C.

EXAMPLE VI

Beta-methallyloxypropionaldehyde is prepared by reacting acrolein with methallyl alcohol in the presence of a small amount of sodium hydroxide, substantially according to the method described in Example V.

EXAMPLE VII

*Dimethallyl acetal of beta-methallyloxy isobutyraldehyde*

A mixture of 203 grams of methacrolein and 1044 grams of methallyl alcohol was mixed with 39 grams of sulphonated phenol-aldehyde resin (Amberlite IR-100) in its hydrogen form, and the mixture was allowed to stand for 5 days at room temperature. The mixture was filtered and the filtrate distilled. The fraction distilling between 40° C. under 10 millimeters' mercury pressure and 160° C. under 1 millimeter mercury pressure, was separated and redistilled. The dimethallyl acetal of beta-methallyloxyisobutyraldehyde was recovered as the fraction distilling at 77° to 79° C. under 1 millimeter mercury pressure and having a refractive index $(n_D^{20})$ of 1.4533. The acetal was found to contain 71.4% C and 10.6% H compared to calculated values of 71.5% C and 10.5% H.

EXAMPLE VIII

*Diallyl acetal of beta-allyloxy isobutyraldehyde*

A solution of 19.2 grams of concentrated sulfuric acid in 861 grams of allyl alcohol was added to 203 grams of methacrolein. After the mixture had stood 6 days at room temperature, it was neutralized by addition of sodium bicarbonate, filtered, and the filtrate was distilled. The diallyl acetal of beta-allyloxypropionaldehyde was separated as the fraction distilling between 79° C. at 20 millimeters' mercury pressure and 105° C. at 10 millimeters' mercury pressure. Upon redistillation the acetal distilled at 96.8° to 97.6° C. under 5 millimeters' mercury pressure and was found to have a refractive index $(n_D^{20})$ of 1.4473. It was analyzed and found to contain 68.6% C and 9.78% H (calculated for $C_{13}H_{22}O_3$, 69.0% C and 9.79% H).

EXAMPLE IX

*Dimethallyl acetal of beta-methallyloxy propionaldehyde*

To a mixture of 163 grams of acrolein and 841 grams of methallyl alcohol there were added 39 grams of sulphonated phenol-aldehyde cation exchange resin (Amberlite IR-100, manufactured by The Resinous Products and Chemical Company) in its hydrogen form. The mixture was allowed to stand for six days at room temperature, then filtered and the filtrate fractionally distilled. In addition to unreacted starting materials and 15 grams of bottoms, there were obtained 145 grams of product distilling from 43° C. under 100 millimeters' mercury pressure to 109° C. under 2 millimeters' mercury pressure. The dimethallyl acetal of beta-methallyloxy propionaldehyde was obtained in pure form by redistillation of the fraction with separation of the material distilling at 92° to 94.8° C. under 2 millimeters' mercury pressure. The portion of acetal thus prepared was found to have a refractive index of $(n_D^{20})$ of 1.4525, and to contain 70.9% C and 10.3% H (calculated for $C_{15}H_{26}O_3$, 70.8% C, 10.3% H).

The claimed invention is:

1. An ether of a beta-oxy lower saturated aliphatic aldehyde, which aldehyde contains a tertiary carbon atom directly linked to the carbon atom of the formyl group, the ether oxygen atom being the beta-oxy oxygen atom of said beta-oxy aldehyde, the hydrogen atom of the hydroxyl group of said beta-oxy aldehyde being replaced by a beta,gamma olefinic hydrocarbon group, said ether containing from seven to eighteen atoms.

2. A diprimary ether of a beta-oxy lower saturated aliphatic aldehyde, the ether oxygen atom being the beta-oxy oxygen atom of said beta-oxy aldehyde, the hydrogen atom of the hydroxyl group of said beta-oxy aldehyde being replaced by an aliphatic hydrocarbon radical in which there is a methylene group ($CH_2=$) directly attached to the beta carbon atom of said radical.

3. A diprimary ether of a beta-oxy lower saturated aliphatic aldehyde, the ether oxygen atom being the beta-oxy oxygen atom of said beta-oxy aldehyde, the hydrogen atom of the hydroxyl group of said beta-oxy aldehyde being replaced by the allyl group.

4. An ether of a beta-oxy lower saturated aliphatic aldehyde, the ether oxygen atom being the beta-oxy oxygen atom of said beta-oxy aldehyde, the hydrogen atom of the hydroxyl group of said beta-oxy aldehyde being replaced by an aliphatic hydrocarbon radical in which there is a methylene group ($CH_2=$) directly attached to the beta carbon atom of said radical, said ether containing from six to eighteen carbon atoms.

5. A diprimary ether of a beta-oxy lower saturated aliphatic aldehyde, the ether oxygen atom being the beta-oxy oxygen atom of said beta-oxy aldehyde, the hydrogen atom of the hydroxyl group of said beta-oxy aldehyde being replaced by an aliphatic hydrocarbon radical in which the beta carbon atom is a tertiary and in which there is a methylene group ($CH_2=$) directly attached to said beta carbon atom, said ether containing from seven to eighteen carbon atoms.

6. An ether of beta-oxy propionaldehyde, the ether oxygen atom being the beta-oxy oxygen atom of said beta-oxy propionaldehyde, the hydrogen atom of the hydroxyl group of said beta-oxy aldehyde being replaced by an aliphatic hydrocarbon radical having an olefinic bond in the beta,gamma position thereof.

7. The allyl ether of beta-oxy propionaldehyde.

8. The methallyl ether of beta-oxy isobutyraldehyde.

9. The diallyl acetal of beta-allyloxypropionaldehyde.

10. A bis(2-alkenyl) acetal of a diprimary ether of a beta-oxy lower saturated aliphatic aldehyde, which aldehyde has the hydrogen atom of the hydroxyl group replaced by an aliphatic hydrocarbon radical in which there is a methylene group ($CH_2=$) bonded to the beta carbon atom.

11. An acetal of a beta,gamma-olefinic alcohol with a diprimary ether of a beta-oxy lower saturated aliphatic aldehyde, which aldehyde has the hydrogen atom of the hydroxyl group replaced by the allyl group.

12. An acetal of a monohydric alcohol with an ether of a lower beta-oxy saturated aliphatic aldehyde, which aldehyde has the hydrogen atom of the hydroxyl group replaced by a beta,gamma-olefinic hydrocarbon group.

13. A process of reacting a beta,gamma-olefinic alcohol with an alpha,beta-olefinic aldehyde, which comprises contacting a mixture comprising the alpha,beta-olefinic aldehyde and the beta,gamma-olefinic alcohol with a catalyst essentially comprising a solid cation-exchange resin that is insoluble in the mixture and capable of existing in a hydrogen form, said resin being substantially in the hydrogen form.

14. A process of reacting in the liquid state a beta,gamma-olefinic alcohol wherein the beta carbon atom is tertiary with an alpha,beta-olefinic aldehyde to produce an acetal, which comprises contacting a mixture comprising the beta,gamma-olefinic alcohol and the alpha,beta-olefinic aldehyde with a catalyst essentially comprising a solid cation-exchange resin that is insoluble in the mixture and capable of existing in a hydrogen form, said resin being substantially in the hydrogen form.

15. A process of reacting in the liquid state methallyl alcohol with acrolein to produce an acetal, comprising contacting a mixture of methallyl alcohol and acrolein with a catalyst essentially comprising a solid cation-exchange resin that is insoluble in the mixture and capable of existing in a hydrogen form, said resin being substantially in the hydrogen form.

16. A compound of the class consisting of the ethers of the beta-oxy lower saturated aliphatic aldehydes, the ether oxygen atom being the beta-oxy oxygen atom of said beta-oxy aldehyde, the hydrogen atom of the hydroxyl group of said beta-oxy aldehyde being replaced by a beta,gamma-olefinic hydrocarbon group, and acetals of monohydric alcohols with the thus-defined aldehyde ethers.

RICHARD R. WHETSTONE.
CURTIS W. SMITH.
DOUGLAS G. NORTON.

REFERENCES CITED

The following references are of record in the file of this patent:

UNITED STATES PATENTS

| Number | Name | Date |
|---|---|---|
| 2,288,211 | Schulz | June 30, 1942 |
| 2,469,288 | Adelson et al. | May 3, 1949 |
| 2,487,879 | Kenyon et al. | Nov. 15, 1949 |

FOREIGN PATENTS

| Number | Country | Date |
|---|---|---|
| 489,330 | Great Britain | July 21, 1938 |

OTHER REFERENCES

Sussman: "Ind. and Eng. Chem.," vol. 38, No. 12, pages 1228 to 1230 (1946).